(12) United States Patent
Nagoya

(10) Patent No.: US 8,432,474 B2
(45) Date of Patent: Apr. 30, 2013

(54) IMAGE PICKUP APPARATUS

(75) Inventor: Miho Nagoya, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 187 days.

(21) Appl. No.: 12/884,928

(22) Filed: Sep. 17, 2010

(65) Prior Publication Data

US 2011/0096195 A1    Apr. 28, 2011

(30) Foreign Application Priority Data

Oct. 22, 2009 (JP) .................................. 2009-243607

(51) Int. Cl.
*H04N 5/222* (2006.01)

(52) U.S. Cl.
USPC .................................. 348/333.02; 348/231.3

(58) Field of Classification Search .................. None
See application file for complete search history.

(56) References Cited

U.S. PATENT DOCUMENTS

| | | | |
|---|---|---|---|
| 7,978,248 B2* | 7/2011 | Terashima | 348/333.05 |
| 2006/0238625 A1* | 10/2006 | Sasaki et al. | 348/231.3 |
| 2007/0065137 A1* | 3/2007 | Hara et al. | 396/291 |
| 2008/0068483 A1* | 3/2008 | Yoshino et al. | 348/333.01 |
| 2009/0237546 A1* | 9/2009 | Bloebaum et al. | 348/333.01 |
| 2009/0322904 A1* | 12/2009 | Takahashi | 348/231.3 |
| 2010/0123815 A1* | 5/2010 | Yim et al. | 348/333.02 |

FOREIGN PATENT DOCUMENTS

| | | | |
|---|---|---|---|
| JP | 2003-199028 A | | 7/2003 |
| JP | 2008-72497 A | | 3/2008 |
| JP | 2008072497 A | * | 3/2008 |

OTHER PUBLICATIONS

JP 2008072497 A Author: Ogawa et al. Date: Mar. 2008 Machine Translation of JP 2008072497 A.*

* cited by examiner

*Primary Examiner* — Chieh M Fan
*Assistant Examiner* — Wesley J Chiu
(74) *Attorney, Agent, or Firm* — Fitzpatrick, Cella, Harper & Scinto

(57) ABSTRACT

An image pickup apparatus is arranged such that in the case where at least either photographing settings at the time of image pickup or object information of the picked-up image coincides with one of a plurality of classification information providing conditions, classification information corresponding to the coincident classification information providing condition is provided to the picked-up image and the image is recorded onto a recording medium, and also such that the image recorded on the recording medium, the classification information thereof and the plurality of classification information providing conditions are displayed to a display unit, and among the plurality of displayed classification information providing conditions, the classification information providing condition which coincides when the classification information provided to the image is provided is recognizably displayed.

12 Claims, 8 Drawing Sheets

IMAGE PICKUP APPARATUS

BACKGROUND OF THE INVENTION

1. Field of the Invention

The present invention relates to an image pickup apparatus for automatically providing the image data with classification information at the time of photographing and processing the image data so that the user can more efficiently execute a post processing of the image data.

2. Description of the Related Art

In recent years, a digital camera has rapidly been spread and the user as a beginner who is not experienced in photographing uses a highly functional digital camera. Further, a large quantity of images can be recorded owing to a progress of a recording medium and an efficient classifying method for a large quantity of images has been proposed.

In a related art of Japanese Patent Application Laid-Open No. 2008-072497, for example, there has been disclosed an image pickup apparatus arranged to attain to easily manage images by automatically classifying the images into classification information based on photographing settings or analysis results of the images at the time of photographing and providing the classification information to headers of the images, thereby enabling the images to be easily managed. For example, if an "auto classification information" setting has been set to ON, the image photographed by a face recognition, an image photographed as a portrait or snapshot, or the like is automatically classified to classification information of "person". Thus, a reproduction, a deletion, and a print designation are enabled every classified classification information.

There is also such a technique (Japanese Patent Application Laid-Open No. 2003-199028 A, for example) for displaying a basic attribute of an image such as a date together with classification information so that the user can easily imagine a photographed scene.

However, according to a user interface for automatically providing the classification information in the related art, since it is difficult for the user to recognize on which judgment the automatically-provided classification information is based or under which condition the classification information is provided, a use efficiency is low.

SUMMARY OF THE INVENTION

It is an aspect of the invention to provide an image pickup apparatus for automatically providing an image with classification information at the time of photographing in consideration of the foregoing problems. More specifically speaking, it is an aspect of the invention to provide an image pickup apparatus in which classification information and a providing condition thereof are explicitly displayed together with an image at the time of reproducing the image so that the user can properly understand a classification information automatically-providing function.

To accomplish the above aspects, an image pickup apparatus of the present invention comprises: an image pickup unit configured to pick up an image; a recording control unit configured to effect recording control in such a manner that in the case where at least either photographing settings at the time when the image is picked up by the image pickup unit or object information of the picked-up image coincides with one of a plurality of classification information providing conditions, the classification information corresponding to the coincident classification information providing condition is provided to the picked-up image and the image is recorded onto a recording medium; and a display control unit configured to effect display control in such a manner that the image recorded on the recording medium, the classification information provided to the image, and the plurality of classification information providing conditions serving as conditions under which the classification information is provided by the recording control unit are displayed to a display unit, and among the plurality of displayed classification information providing conditions, the classification information providing condition which coincides when the classification information provided to the image is provided by the recording control unit is recognizably displayed.

In addition, a display control apparatus of the present invention, for controlling to display, on a display unit, an image which is recorded in such a manner that when an image is picked up by an image pickup apparatus, classification information was provided to the picked-up image on the basis of photographing settings of the image pickup apparatus and object information of the image and the resulted image is recorded, comprises: a reading unit configured to read out the image, the classification information provided to the image, a plurality of classification information providing conditions serving as conditions under which the classification information is provided by the image pickup apparatus, and judgment information showing the classification information providing condition which coincides when the classification information is provided by the recording control unit; and a display control unit configured to effect display control in such a manner that the image read out by the reading unit, the classification information provided to the image, and the plurality of classification information providing conditions serving as conditions under which the classification information is provided by the image pickup apparatus are displayed to the display unit, and among the plurality of displayed classification information providing conditions, the classification information providing condition shown by the judgment information read out by the reading unit is recognizably displayed.

According to the image pickup apparatus or display control apparatus of the invention, the following technological advantages can be accomplished. As for the image and the classification information provided to the image, since a plurality of conditions under which the classification information is provided and the condition serving as a reason why the classification information has been provided can be recognizably displayed, the user can properly understand the classification information automatically-providing function.

Further features of the present invention will become apparent from the following description of exemplary embodiments with reference to the attached drawings.

DESCRIPTION OF THE EMBODIMENTS

Exemplary embodiments of the present invention will now be described in detail with reference to the attached drawings.

First Embodiment

Figure 1:
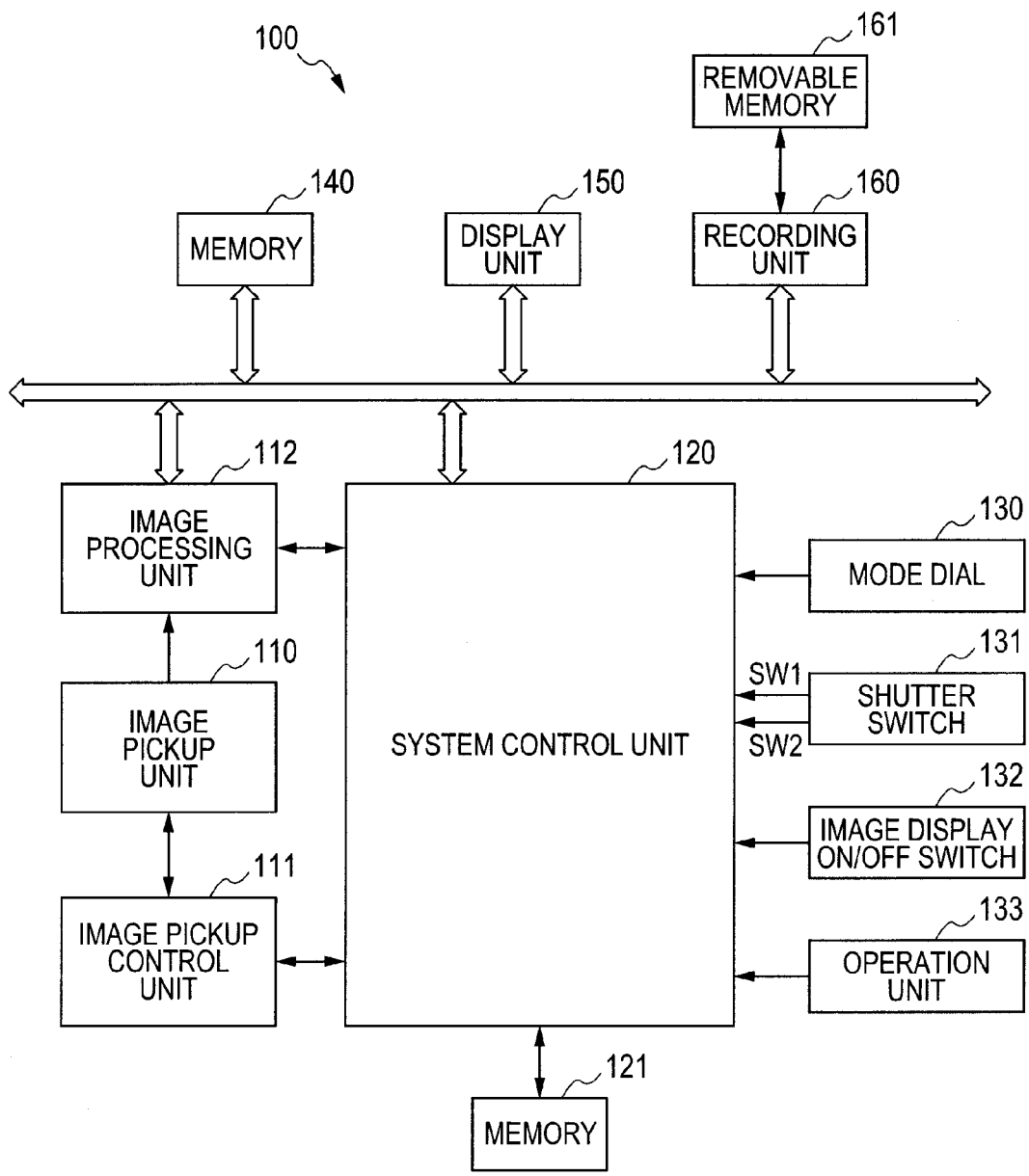
FIG. 1 is a block diagram illustrating a construction of an image pickup apparatus according to the invention.

FIG. 1 is a diagram illustrating a principal construction of an image pickup apparatus 100 (for example, digital camera) according to the embodiment.

In FIG. 1, an image pickup unit 110 picks up an object by using an image sensor and forms image data. An image pickup control unit 111 controls the operation of the image pickup unit 110 by instructions from a system control unit 120. The image pickup control unit 111 transfers information of the image data formed by the image pickup unit 110 to a memory 140.

An image processing unit 112 performs a predetermined operation processing by using the image data held in the memory 140, adjusts an image by photographing information which is provided from the image pickup unit 110, and compresses the adjusted image data according to a predetermined image compression method.

The system control unit 120 controls the whole image pickup apparatus 100. A memory 121 stores constants, variables, programs, and the like for the operation of the system control unit 120. The system control unit 120 also executes a classification processing for classifying the image based on a result of the arithmetic operation executed by the image processing unit 112 and photographing settings of the image pickup apparatus held in the memory 140 and writing classification information and its classification judgment conditions thereof into a header of the image.

Operation units 130, 131, 132, and 133 are provided to input various kinds of operation commands of the system control unit 120 and are constructed by a single device or by a combination of a plurality of devices including a switch, a dial, a touch panel, a pointing by a viewpoint detection, an audio recognition apparatus, and the like. A mode dial switch 130 is arranged to switch and set various kinds of function modes such as turn-off of a power source, auto photographing mode, photographing mode, panorama photographing mode, reproduction mode, multi screen reproduction/deletion mode, PC connection mode, and the like. A shutter switch 131 has switch steps SW1 and SW2. The switch step SW1 instructs a start of the operation such as AF (auto-focus) processing, AE (auto-exposure) processing, AWB (auto-white balance) processing, EF (flash light pre-emitting) processing, or the like. The switch step SW2 instructs a start of the operation such as exposure processing for writing the image data formed by the image pickup unit 110 into the memory 140, development processing using the arithmetic operation in the image processing unit 112, and a series of processings for reading out the image data from the memory 140 and writing into a removable memory 161. An image display ON/OFF switch 132 can set ON/OFF of a display unit 150. An operation unit 133 is constructed by various kinds of buttons, a touch panel, and the like. As buttons included in the operation unit 133, there are a menu button, a setting button, a macro button, a multi screen reproduction page feeding button, a flash light setting button, and a single/continuous/self-timer photographing switch-over switch. The operation unit 133 also includes a menu shift plus (+) button, a menu shift minus (−) button, a reproduction image feed plus (+) button, and a reproduction image feed minus (−) button. The operation unit 133 further includes a photographing image quality selection button, an exposure correction button, a data/time setting button, a signature embedding setting button, and an alteration detection setting button.

The memory 140 is a memory for storing photographed still image and video image and has a storage amount enough to store a predetermined number of still images and video images of a predetermined time. The memory 140 can be also used as a work area of the system control unit 120.

The display unit 150 is constructed by a TFT LCD (thin film transistor liquid crystal display) or the like and displays the image data for display written in the memory 140. Further, if the picked-up image data is sequentially displayed by using the display unit 150, an electronic viewfinder function can be realized.

The display unit 150 displays various kinds of settings of the image pickup apparatus and can change the various kinds of settings by the operation unit 133. The display unit 150 is arranged to arbitrarily turn on/off the display in accordance with instructions of the system control unit 120.

A unit 160 writes an image file designated by the system control unit 120 into the removable memory 161 or reads out an image file designated by the system control unit 120 from the removable memory 161. The removable memory 161 is a recording medium such as memory card, hard disk, or the like.

The foregoing image pickup apparatus 100 can perform the photographing using one center point AF or face AF. "One center point AF" denotes an operation for performing the AF to one point at the center position in a photographing display screen. "Face AF" denotes an operation for performing the AF to the face in a photographing display screen detected by a face detecting function.

The face detecting function will be described. The system control unit 120 transfers subject image data of the face detection to the image processing unit 112. Under the control of the system control unit 120, the image processing unit 112 allows a horizontal direction band-pass filter to act on the image data. Under the control of the system control unit 120, the image processing unit 112 also allows a vertical direction band-pass filter to act on the processed image data. Edge components are detected from the image data by those horizontal and vertical direction band-pass filters.

After that, the system control unit 120 performs a pattern matching with respect to the detected edge components and extracts candidate groups of the eyes, nose, mouse, and ears. From the extracted candidate group of the eyes, the system control unit 120 determines the candidates which satisfy preset conditions (for example, a distance between the two eyes, a slope, and the like) as pairs of eyes, and narrows down only the candidates each having the pair of eyes as a candidate group of the eyes. The system control unit 120 allows the narrowed candidate group of the eyes to correspond to other parts (nose, mouse, and ears) forming the faces corresponding to the narrowed candidate group. On the other hand, the system control unit 120 allows the narrowed candidate group of the eyes to pass through a preset non-face condition filter, thereby detecting the faces. The system control unit 120 outputs the face information according to a detection result of the face and finishes the processing routine. At this time, feature amounts such as the number of faces and the like are stored into the memory 140.

As mentioned above, by analyzing the image data which is live-view displayed or is reproduction displayed, the feature amounts of the image data are extracted and object information can be detected. Although the face information has been mentioned as an example of the object information in the embodiment, as other object information, there are various kinds of information such as red-eye judgment, eye detection, eye-closing detection, smiling-face detection, and the like.

A face AE, a face FE, and a face WB can be executed simultaneously with the face AF. "Face AE" denotes an operation for optimizing an exposure of the whole display screen according to brightness of the detected face. "Face FE" denotes an operation for adjusting flash light around the detected face as a center. "Face WB" denotes an operation for optimizing a white balance (WB) of the whole display screen according to a color of the detected face.

Figure 2A:
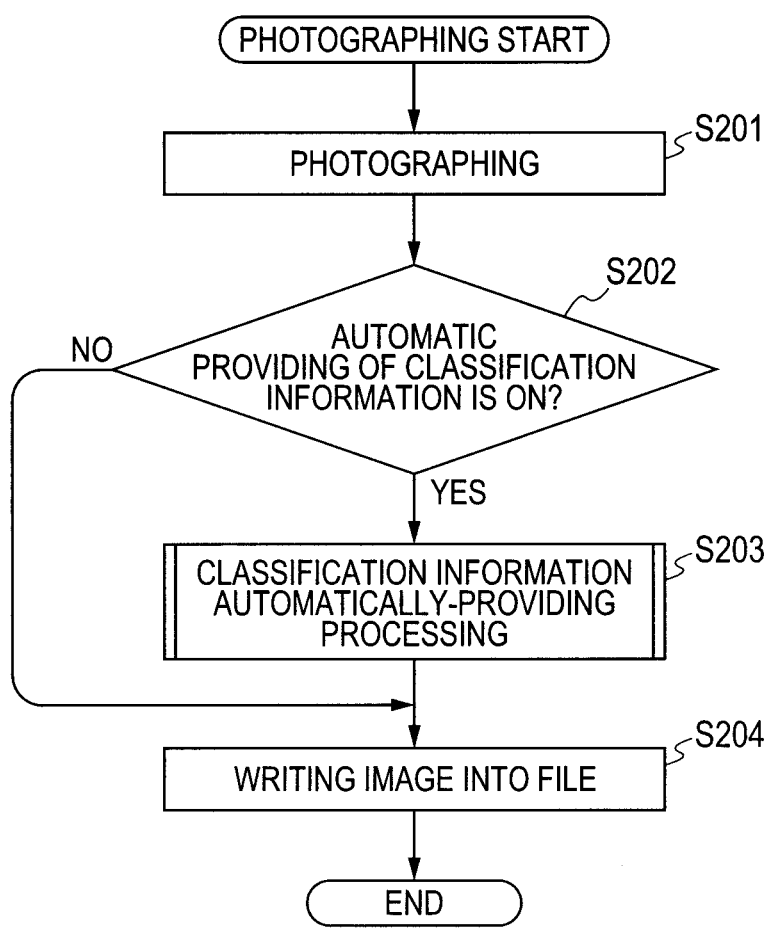
FIG. 2A is a flowchart illustrating a classification information providing processing which is executed at the time of photographing in the image pickup apparatus according to the invention.
Figure 2B:
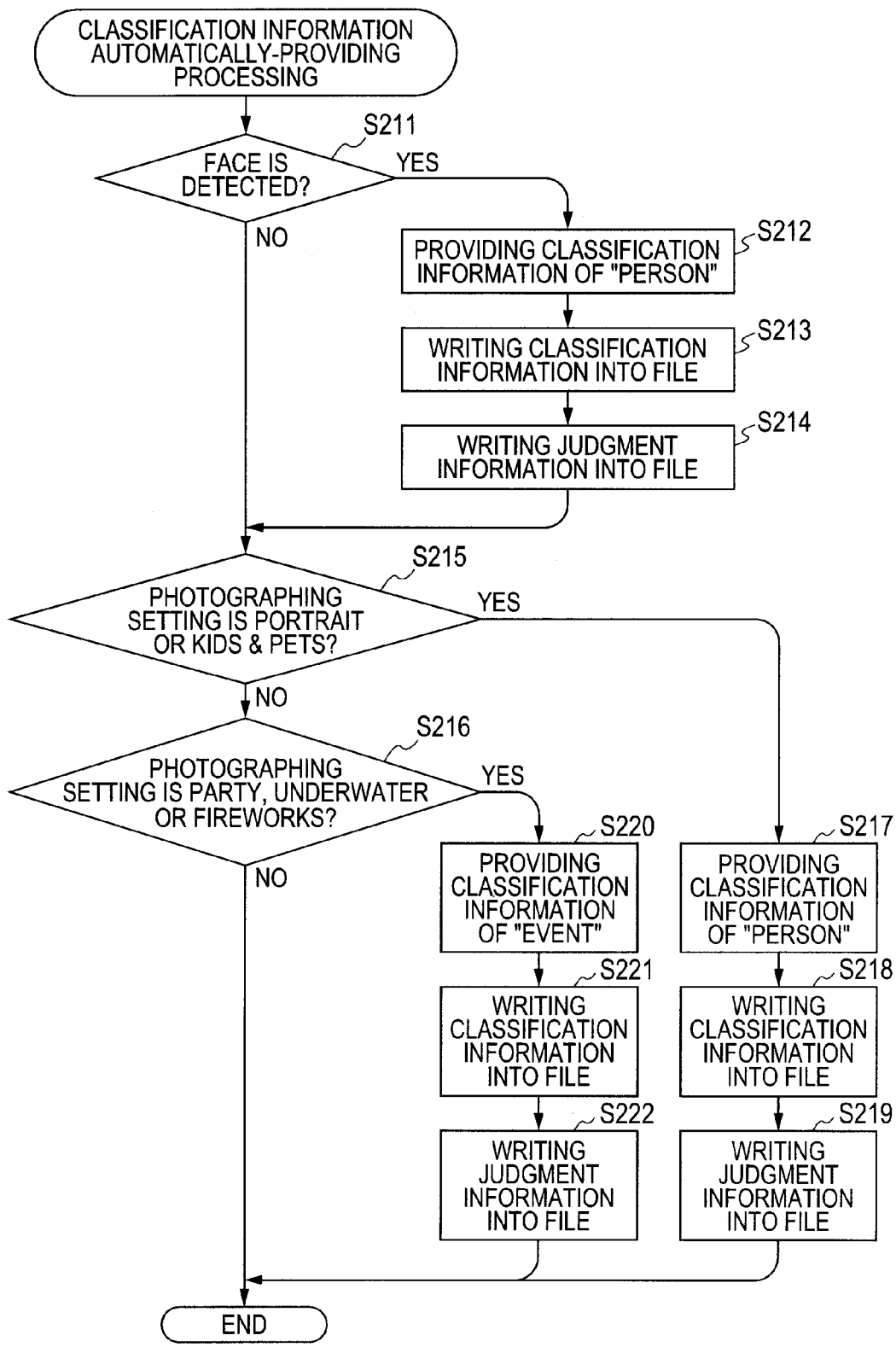
FIG. 2B is a flowchart illustrating a classification information automatically-providing processing which is executed in the processing for providing the classification information according to the invention.

FIGS. 2A and 2B are flowcharts for a processing for providing the classification information to a header of the image at the time of photographing in the embodiment. The flowcharts are realized when the system control unit 120 develops the programs recorded in the memory 121 into the memory 140 and executes them. When the photographing is started (step S201), in step S202, the system control unit 120 obtains a setting value "ON/OFF" of the automatic providing of the classification information from the memory 140 and discriminates whether or not the classification information is automatically provided to the photographed image. If the setting of the automatic providing of the classification information is "OFF" and the automatic providing is not performed, the processing routine advances to step S204.

If it is determined in step S202 that the setting of the automatic providing of the classification information is "ON" and the automatic providing of the classification information is performed, the processing routine advances to a classification information automatically-providing processing (step S203). In the classification information automatically-providing processing shown in FIG. 2B, the system control unit 120 reads out the face information held in the memory 140 by a face detection processing of step S211 and discriminates whether or not the face has been detected with respect to the current photographed image. If it is decided that the face has been detected, step S212 follows and classification information of "person" is formed. In step S213, the classification information of "person" is written into a header of an image file of the photographed image. Further, a classification information providing condition of the face detection used in the judgment adapted to provide the classification information is also similarly written into the header as judgment information of the classification information (step S214). "Judgment information" here denotes information indicating which classification information providing condition (condition for providing the classification information at the time of photographing) was satisfied by the classification information provided to the image, in other words, it is information showing on which judgment the classification information was provided based.

Subsequently, in step S215, the system control unit 120 discriminates whether or not the current photographing mode is either "portrait mode" or "kids & pets mode". This judgment is made with reference to the photographing mode set in the image pickup apparatus (with reference to the current photographing mode stored in the memory 140). It is assumed that an auto mode (auto setting mode), a manual mode, and a scene mode are included in the photographing mode. The auto mode is a mode in which the system control unit 120 automatically decides various kinds of parameters regarding the image pickup based on a measured exposure value by the programs installed in the image pickup apparatus 100. The manual mode is a mode in which the user can freely change various kinds of parameters of a camera. The scene mode is a mode in which a combination of a shutter speed, an iris value, a strobe light condition, a sensitivity setting, and the like which are suitable for a photographing scene is automatically set. The scene mode includes the following modes, that is: a portrait mode; a night view mode; a landscape mode; a night & snapshot mode; a kids & pets mode; a fresh green & autumn leaves mode; a party mode; a snow mode; a beach mode; a fireworks mode; an aquarium mode; an underwater mode; and the like. If it is decided in step S215 that the photographing setting is "portrait mode" or "kids & pets mode", the processing routine advances to step S217 and the classification information of "person" is formed. In step S218, "person" is written as classification information into the header of the file. Further, the judgment information used for the judgment to provide the classification information is also similarly written into the header (step S219). The judgment information which is recorded into the header is information specifying whether the reason why the classification information "person" is provided is that the image was photographed in the "portrait mode" or that the image was photographed in the "kids & pets mode".

In step S215, if the photographing mode is not the "portrait mode" or "kids & pets mode", step S216 follows. Similarly, in step S216, if one of the "party mode", "underwater mode", and "fireworks mode" has been set with reference to the photographing mode, step S220 follows. In step S220, classification information of "event" is formed as tag information. In step S221, the classification information is written into the header. In step S222, the judgment information is written into the header. The judgment information which is recorded into the header is information specifying whether the reason why the classification information "event" is provided is that the image was photographed in which one of the scene modes such as "party mode", "underwater mode" and "fireworks mode". After completion of the writing of the classification information and the judgment information into the header, the image is written into the image file and the photograph processing is finished.

Although several scene modes have been mentioned as an example above as photographing settings of the camera at the time of photographing when the classification information is automatically provided, the photographing settings are not limited to them so long as they are the photographing settings of the camera at the time of photographing. Although the face detection has been mentioned as an example above as object information, the object information is not limited to it.

Further, the classification information which is to be automatically provided is not limited to "person" and "event" but other information which can be conveniently used by the user after the photographing may be used.

As mentioned above, the image pickup apparatus of the invention discriminates whether or not at least either the photographing settings at the time when the image has been picked up by the image pickup unit or the object information of the picked-up image coincides with any one of a plurality of classification information providing conditions. The classification information corresponding to the coincident classification information providing condition is provided to the picked-up image and the resultant image is recorded onto the recording medium. The image pickup apparatus of the invention is constructed so as to have a recording control unit for making such a judgment and for making control of the recording. Therefore, the photographed image can be automatically recorded together with information which is more useful to the user. The subsequent image processing functions can be made more effective.

Figure 3:
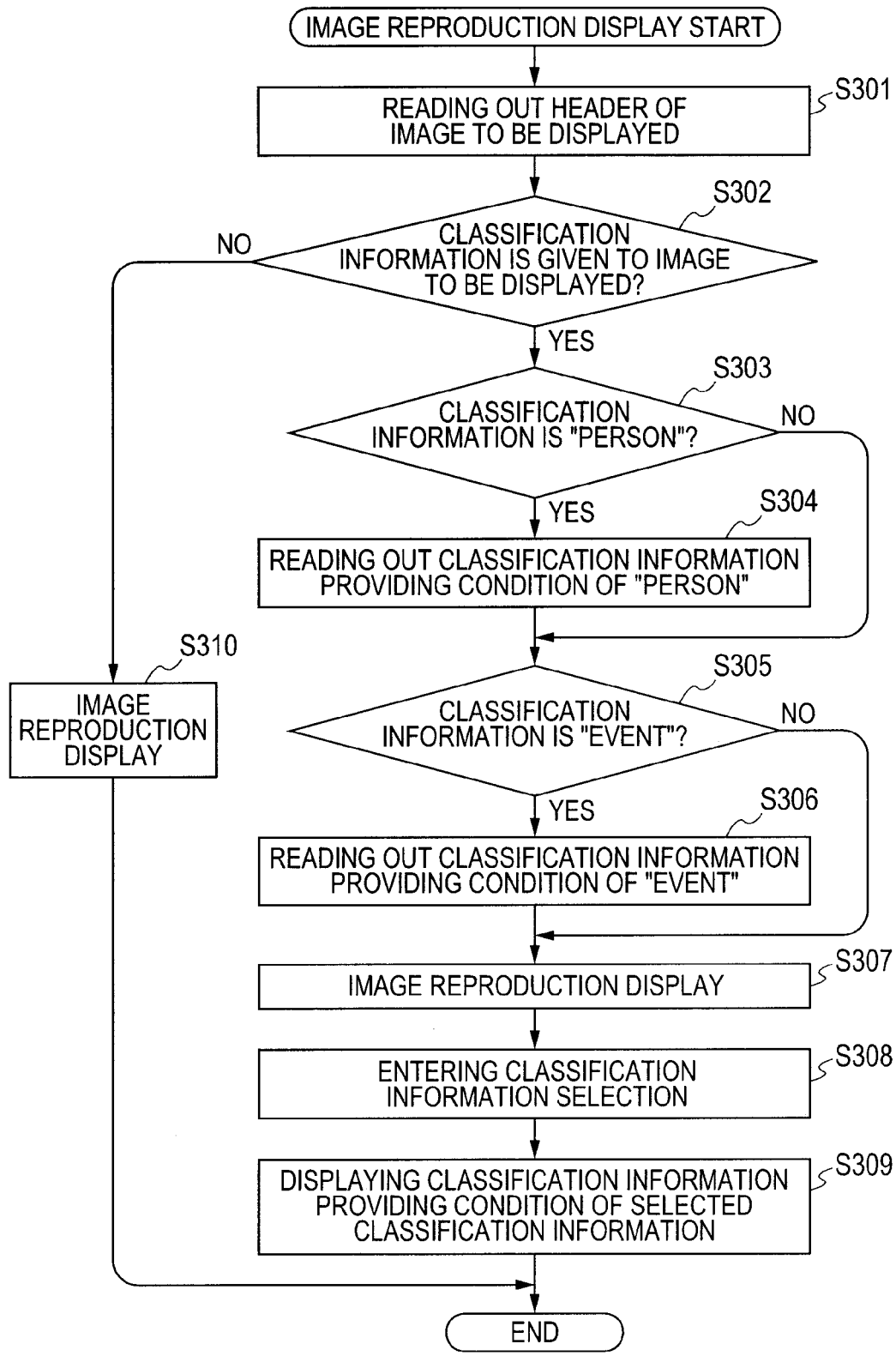
FIG. 3 is a flowchart illustrating a processing for reproducing and displaying an image provided with the classification information according to the invention.

FIG. 3 is a flowchart illustrating a processing in the case where an image which was photographed and has been recorded in the removable memory 161 is reproduced and displayed in the display unit 150. The flowchart is realized when the system control unit 120 develops the program recorded in the memory 121 into the memory 140 and executes it. In the image pickup apparatus 100, when the reproduction display of the image is started, in step S301, the system control unit 120 reads out header information of the image file which is reproduced. In step S302, whether or not the classification information has been written in the read-out header information is discriminated. If the classification information is not described, only the image is displayed in the display unit 150 (step S310). If the classification information has been written, whether or not the classification information is "person" is discriminated in step S303. If the classification information is "person", all of the classification information providing conditions of "person" are read out of the memory 121 of the image pickup apparatus 100 (step S304). Further, whether or not the classification information is "event" is discriminated in step S305. If the classification information is "event", all of the classification information providing conditions of "event" are read out of the memory 121 of the image pickup apparatus 100 (step S306).

Figure 4A:
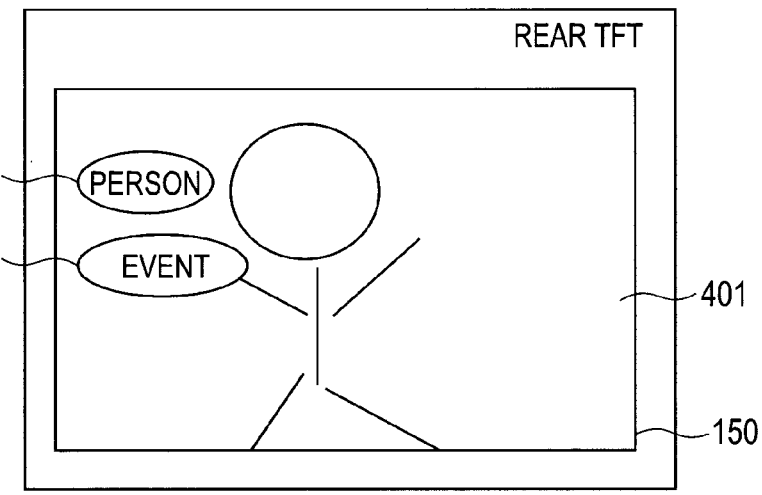
FIG. 4A is a diagram illustrating an example of an image display screen in the processing for reproducing and displaying the image provided with the classification information in the invention.

Subsequently, as shown in FIG. 4A, the image is displayed to the display unit 150 together with display items showing the read-out classification information (step S307). FIG. 4A is an example in which an image 401 provided with the classification information of "person" and the classification information of "event" is displayed. A display item 402 showing the classification information of "person" and a display item 402 showing the classification information of "event" are displayed together with the image 401.

Subsequently, the apparatus waits for a selection input of the displayed classification information from the operation unit 133 and if there is the selection input, the apparatus receives the selection (step S308). The selection input is performed by the operation of the operation unit 133 for selecting one of the display items 402 and 403 showing the classification information provided to the image 401. If there is the selection input, among the classification information providing conditions read out in steps S304 and S306, all of the classification information providing conditions as conditions under which the selected classification information is provided are displayed as a list of the classification information providing conditions (step S309). At this time, the classification information providing condition corresponding to the recorded judgment information is highlighted and displayed together with the reproduction image.

Figure 4B:
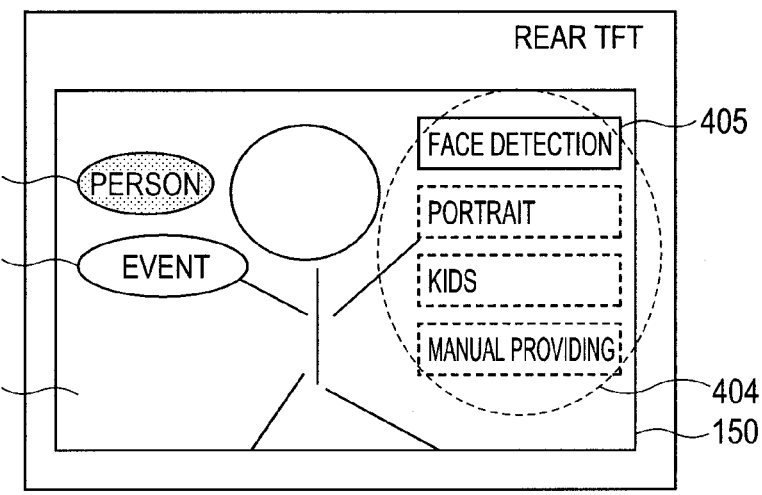
FIG. 4B is a diagram illustrating an example of a display screen at the time when the classification information has been selected in the image display screen in the invention.
Figure 4C:
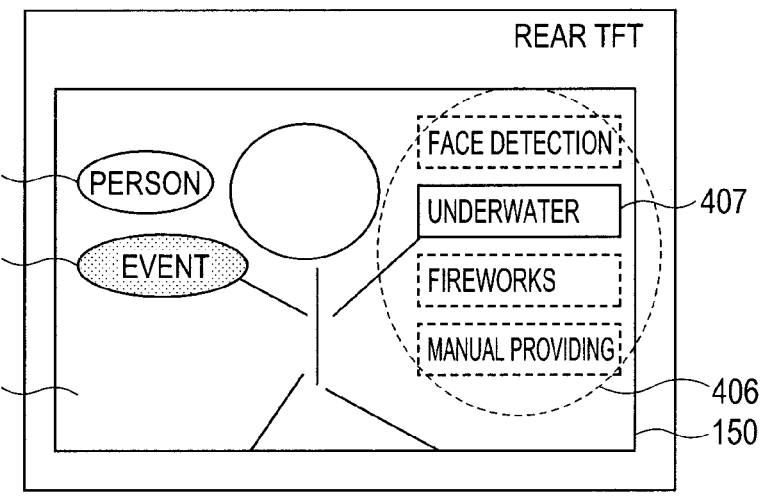
FIG. 4C is a diagram illustrating another example of the display screen at the time when the classification information has been selected in the image display screen in the invention.

Display examples of the classification information providing condition lists of the invention are illustrated in FIGS. 4B and 4C. FIG. 4B illustrates a case where the display item 402 showing the classification information of "person" has been selected by the operation unit 133. In this case, a classification information providing condition list 404 of the classification information of "person" is displayed and an item 405 corresponding to the "face detection" shown by the stored judgment information is highlighted more than other items and displayed together with the image 401. By seeing this display, the user can understand that the classification information of "person" among the classification information provided to the image 401 was automatically provided at the time of photographing because the image pickup apparatus 100 had already detected the face when the image 401 has been photographed. FIG. 4C illustrates a case where the display item 403 showing the classification information of "event" has been selected by the operation unit 133. Also in this case, a classification information providing condition list 406 of the classification information of "event" is displayed and an item 407 corresponding to a scene mode of "underwater" shown by the stored judgment information is highlighted more than other items and displayed together with the image. By seeing this display, the user can understand that the classification information of "event" among the classification information provided to the image 401 was automatically provided because the image pickup apparatus 100 had already been set to the underwater mode included in the scene modes when the image 401 has been photographed.

The judgment information showing the reason why the classification information was provided to the image is recognizably displayed in correspondence to the image in this manner, so that the user can easily recognize by which one of the classification information providing conditions the displayed classification information has been provided.

As mentioned above, the image pickup apparatus of the invention has the display control unit which accomplishes the construction of the invention.

That is, the display control unit of the invention displays the image recorded on the recording medium, the classification information provided to the image, and a plurality of classification information providing conditions serving as conditions under which the classification information is provided by the recording control unit of the invention to the display unit. Further, among the plurality of displayed classification information providing conditions, the classification information providing condition which coincides when the classification information provided to the image is provided by the recording control unit is recognizably displayed. The foregoing technological advantages can be accomplished by the display control unit having the above construction.

Second Embodiment

In a second embodiment, a method of setting a change in the classification information providing conditions registered in the image pickup apparatus described in the first embodiment and a user interface will be described.

Figure 5:
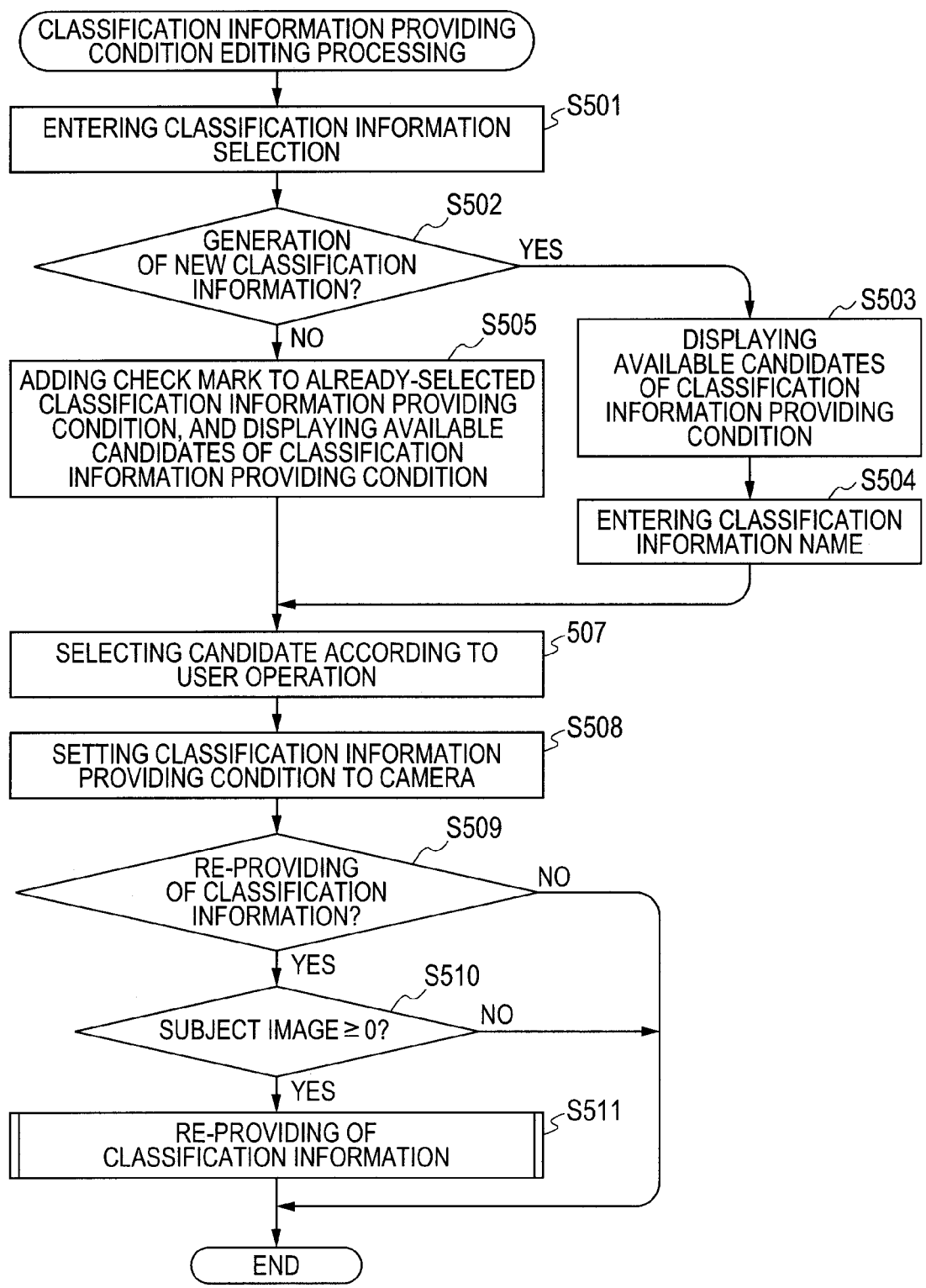
FIG. 5 is a flowchart illustrating a processing for editing a classification information providing condition in the invention.
Figure 6:
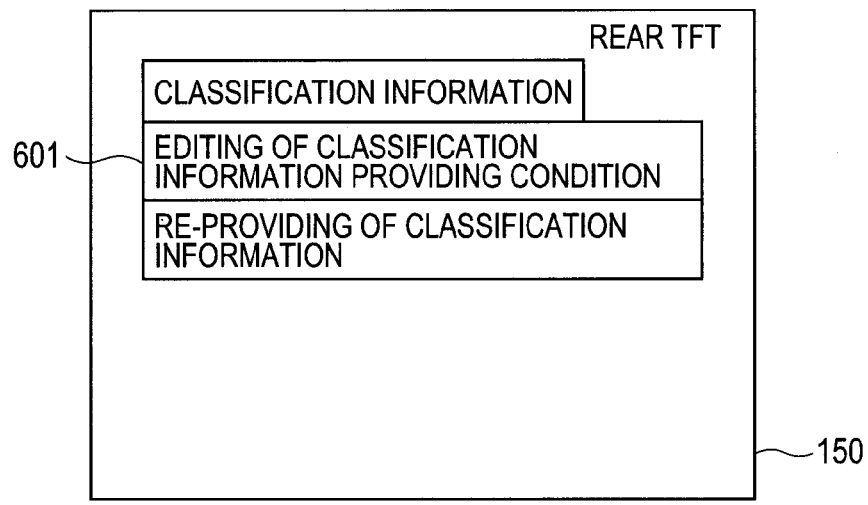
FIG. 6 is a diagram illustrating an example of a user interface for selecting the editing processing of the classification information providing condition in the invention.
Figure 7:
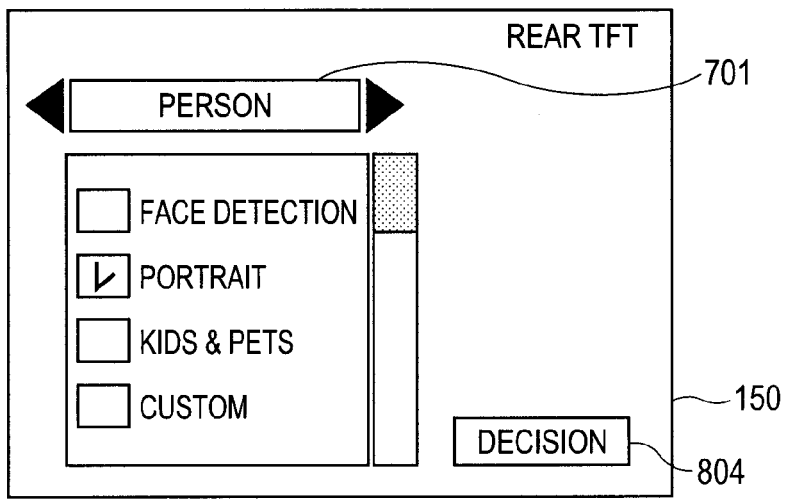
FIG. 7 is a diagram illustrating an example of a user interface for editing the classification information providing condition in the invention.
Figure 8:
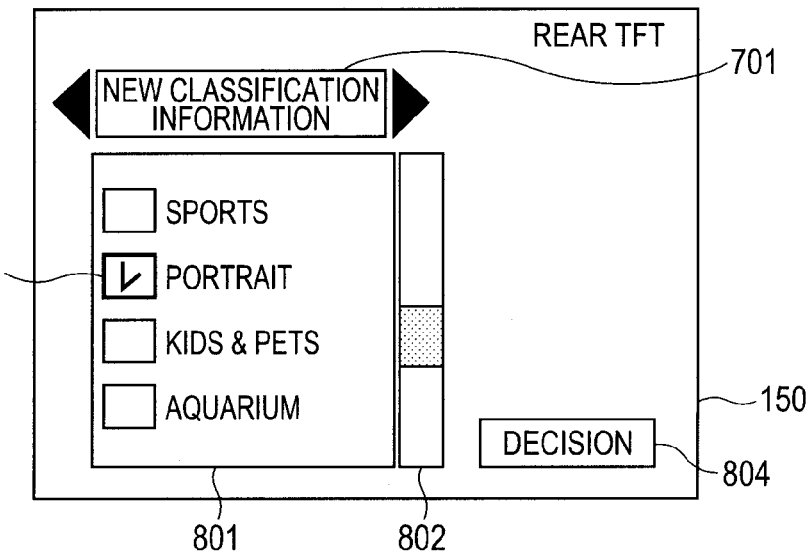
FIG. 8 is a diagram illustrating an example of the user interface for editing the classification information providing condition in the invention.

FIG. 5 is a flowchart illustrating its setting procedure. FIGS. 6 to 8 illustrate examples of the user interfaces.

When a "classification information providing condition editing" function 601 which is displayed in the display unit 150 illustrated in FIG. 6 is selected by the operation unit 133 of the image pickup apparatus 100, the display screen transits to an editing screen of the classification information providing conditions illustrated in FIG. 7 and the classification information providing condition editing processing of FIG. 5 is started. This flowchart is realized when the system control unit 120 develops the program recorded in the memory 121 into the memory 140 and executes it.

In step S501, a selection of classification information to be edited is received. The user performs the selection of the classification information as follows. In the editing screen of the classification information providing condition of FIG. 7, an item 701 showing the selected classification information is selected by using up and down buttons of cursor buttons included in the operation unit 133. In this state, when right and left buttons included in the cursor buttons are depressed, the classification information displayed in the item 701 is switched to one of the existing classification information and "new classification information".

By depressing the right and left buttons a plurality of number of times, one classification information is sequentially switched among the existing classification information and the "new classification information" and displayed in the item 701. That is, by depressing the right and left buttons in a state where the item 701 has been selected, the system control unit 120 receives the classification information to be edited. When desired classification information is displayed in the item 701, the user executes the subsequent editing operation. The system control unit 120 executes the following processing according to the editing operation from the user.

In step S502, whether or not the selected classification information is "new classification information" is discriminated. That is, the above step relates to a discrimination about whether or not classification information is newly formed. If the selected classification information is "new classification information", all available candidates of the classification information providing condition are displayed as a list to the display unit 150 (step S503). In step S504, an input of the name of "new classification information" is received and if there is an input of the name, a classification information name of "new classification information" is set. In subsequent step S507, user's arbitrary candidates are selected from all available candidates of the classification information providing condition displayed as a list according to the user's operation. When the selection is finished, the processing routine advances to step S508.

An example of the user interface which is displayed at this time is illustrated in FIG. 8. In FIG. 8, since "new classification information" has been selected, "new classification information" is displayed in the item 701.

The above example relates to a case where a default classification information name is not changed. All of the available candidates of the classification information providing condition are displayed as a list on a list display unit 801. Since there is no display space in which all of the candidates are displayed in a lump, all of the candidates can be viewed by scrolling a scroll bar 802 as illustrated in the diagram. A check mark is displayed in a check box 803 of the portrait. This shows that a mode in which an image is photographed in the "portrait mode" has been selected as one of the classification information providing conditions of the new classification information. Although an arbitrary method may be used as an operating method in each of steps S504 and S507, for example, the operation is executed as follows. By depressing a setting button included in the operation unit 133 in a state where "new classification information" was selected by selecting the item 701 and depressing the right and left buttons, the display screen enters a state where the classification information name can be changed (input entering condition of the classification information name). By operating the operation unit 133 in this state, a character string is changed from "new classification information" displayed in the item 701 to another character string. An operating method of changing the character string can be attained by the well-known technique. For example, by setting the head of the character string into a selecting state and depressing the up and down buttons, a character at a position in the selecting state is sequentially changed.

Thus, when a desired character appears, by depressing the right button, the character in the selecting state in the character string is switched to the character existing on the right side by one character. Similarly, the characters are changed by operating the up and down buttons.

By repeating the above operation, an arbitrary character string is input and by depressing the setting button at last, the character string is defined, the display screen exits from the state where the classification information name can be changed and is returned to the state where the item 701 has been selected. At this time, the changed character string is displayed in the item 701. The above operations relate to the processing of step S504. From the state where the item 701 has been selected, the list display unit 801 among the item 701, list display unit 801, and a decision icon 804 is selected by operating the up and down buttons in the cursor buttons included in the operation unit 133. By depressing the setting button included in the operation unit 133 in a state where the list display unit 801 has been selected, one of all available candidates of the classification information providing condition displayed in the list display unit 801 enters the selecting state. By operating the up and down buttons in this state, the selected candidates among all of the available candidates of the classification information providing condition can be switched. Therefore, the user selects an arbitrary candidate by operating the up and down buttons. By operating the setting button in the state where the arbitrary candidate has been selected, a check mark is displayed if no check mark is displayed in a check box of the selected candidate. If the check mark has already been displayed, the display of the check mark is deleted. The check mark may be added to one candidate or may be added to a plurality of arbitrary candidates. After the check mark was added to the candidate to be set to the classification information providing condition, the user depresses a back button included in the operation unit 133. Thus, the display screen is returned to the state where the list display unit 801 has been selected. The apparatus enters a state where an arbitrary one of the item 701, list display unit 801, and decision icon 804 can be selected by operating the up and down buttons. The above operations relate to the processing of step S507.

When the decision icon is selected and the setting button is depressed here, it is determined that the candidate in which the check mark is displayed at present becomes the classification information providing condition of "new classification information", and step S508 follows.

If the classification information selected in step S502 is other than "new classification information", all of the available candidates of the classification information providing condition are displayed in the display unit 150 (step S505). At this time, the check mark is displayed as a default to the candidate which has already been the classification information providing condition. In next step S507, the selection of the arbitrary candidate by the user is received from all of the available candidates of the classification information providing condition as mentioned above. After completion of the selection of the candidate, when the decision icon 804 is depressed, in step S508, the candidate in which the check mark has been displayed at present is recorded into the memory 121 as a classification information providing condition of the classification information displayed in the item 701, so that it is set into the image pickup apparatus 100.

In step S509, a dialog box (not shown) for inquiring about whether or not the classification information should be re-provided by using the classification information providing condition set in step S508 is displayed. Thus, whether the user has selected that the classification information is provided again (re-providing) or has selected that the classification information is not provided is discriminated. If the re-providing is selected, step S510 follows and whether or not there is a subject image to be re-provided is discriminated (step S510). If YES, the classification information is re-provided (step S511) and the processing routine is finished. Upon re-providing of the classification information, first, with respect to the image to which the classification information whose classification information providing condition was changed in S508 has already been provided, whether or not such classification information is not provided under the new classification information providing condition is discriminated. As a result of the discrimination, if there is the image to which the classification information is not provided, the classification information is deleted from the header of the image. With respect to the image to which the classification information whose classification information providing condition was changed in S508 is not provided, whether or not such classification information is provided under the new classification information providing condition is discriminated. As a result of the discrimination, if there is the image to which the classification information is provided, the classification information is recorded into the header of the image. If it is determined in step S510 that there are no subject images of the re-providing, the classification information is not re-provided and the processing routine is finished.

In the user interface illustrated in FIG. 6, when the "classification information re-providing" function is selected, a processing similar to step S511 is executed to all of the classification information.

According to the second embodiment of the invention described above, in the image pickup apparatus of the invention, a change unit for changing the classification information providing condition of the specific classification information based on the operation of the user can be provided. Thus, the automatic providing of the classification information which can be easily understood by the user in consideration of the photographing settings or the like can be easily attained.

A display item for transiting to the editing screen for allowing the change unit to change the classification information providing condition can be displayed together with the classification information added to the image and its classification information providing condition on a reproduction display screen of the image. Therefore, use efficiency of the user interface can be improved and the classification information providing condition which the user desires can be easily attained.

Figure 9:
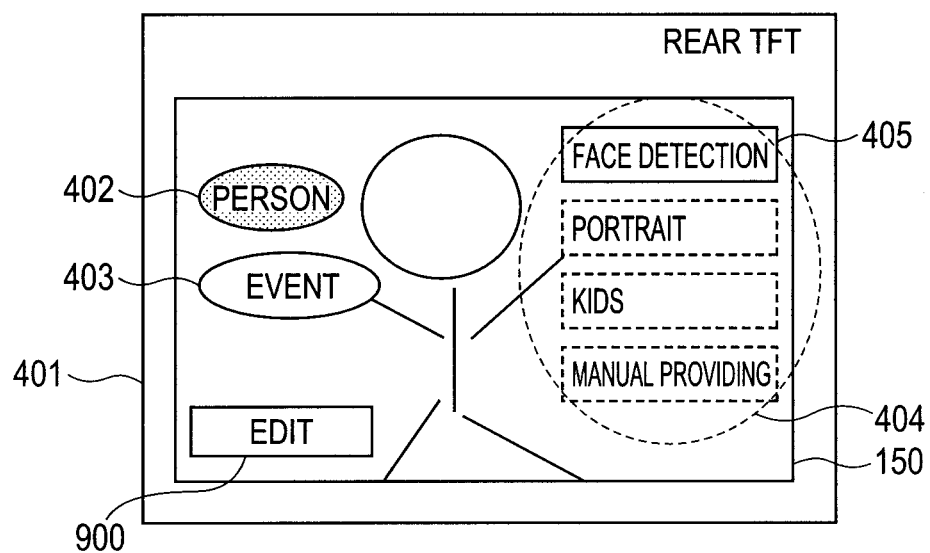
FIG. 9 is a diagram illustrating another example of the user interface for selecting the editing processing of the classification information providing condition in the invention.

Although the user interface to be transited to the editing screen (FIG. 7 or 8) of the classification information providing condition has been described by using FIG. 6, it can be also transited from the display screen of the classification information providing condition list as illustrated in FIG. 4A or 4B mentioned in the first embodiment. FIG. 9 illustrates an example in which the display item for transiting to the editing screen of the classification information providing condition is displayed on the display screen of the classification information providing condition list. In addition to a display similar to FIG. 4B, FIG. 9 displays an editing screen calling button 900 serving as a shortcut button to the editing screen of the classification information providing condition. By selecting the editing screen calling button 900 and depressing the setting button included in the operation unit 133, the display screen transits to the editing screen (FIG. 7) of the classification information providing condition described in the second embodiment and the classification information providing condition editing processing of FIG. 5 can be started.

As illustrated in FIG. 9, together with the displayed image 401, the display items 402 and 403 showing the classification information provided to the image 401, the classification information providing condition list 404 of the selected classification information, and the classification information providing condition 405 shown by the judgment information are explicitly displayed. Thus, although the user can understand how the classification information is automatically provided, he can also recognize the necessity of customization of the classification information providing condition. In consideration of such a case, the editing screen calling button 900 is also simultaneously displayed on the display screen of FIG. 9. Consequently, when the user considers that it is necessary to customize the classification information providing condition, the display screen can immediately transit to the editing screen of the classification information providing condition and the operability is improved.

It is also possible to presume that there is classification information of "failed photo" as one of the classification information.

The classification information of "failed photo" also has peculiar classification information providing condition in a manner similar to the classification information described in the first embodiment and is automatically provided when the photographing settings and the object information coincide with the classification information providing condition. As a classification information providing condition of "failed photo", for example, the following state is considered: the person registered in the image pickup apparatus 100 is not photographed; an eye closing was detected; there is an over/under exposure; there is a camera shaking; or the like. However, an image which is considered as "failed photo" differs depending on a photographing object of the user, a photographing skill of the user, a photographing scene, or the like and is not unconditional. Therefore, it is more desirable if the customization (edition) of the classification information providing condition as disclosed in the foregoing second embodiment is applied to the classification information of such "failed photo". By using the classification information of "failed photo" as mentioned above, the photographed image which the user does not desire can be identified and the user can easily recognize reasons of the failure. Since the classification information providing condition of the classification information of "failed photo" can be also changed and set, the classification information providing condition can be properly set according to a photographing situation or the like and the classification information of "failed photo" can be provided to the photographed image which the user considers as a failure.

Although various kinds of using methods of the classification information mentioned above are considered, for example, the classification information can be used as follows.

Among a plurality of images, only the images provided with the classification information designated by the user are deleted. For example, only the images provided with the classification information of "failed photo" are deleted in a lump.

Among a plurality of images, only the images provided with the classification information designated by the user are displayed by a slide show. For example, a slide show in which the images provided with the classification information of "event" are set to reproduction subjects is performed.

Among a plurality of images, only the images provided with the classification information designated by the user are transferred or printed.

As a method of designating the classification information by the user in the use of those classification information, naturally, a designation using a combination of an AND condition, an OR condition, and a NOT condition can be performed with respect to a plurality of classification information.

In the construction of the invention mentioned above, the control by the system control unit 120 may be made by one hardware unit or such a construction that a plurality of hardware units take over the processings, thereby attaining the control of the whole apparatus. In particular, the processings of FIGS. 2A and 2B mentioned above are executed by the image pickup apparatus and the processings of FIGS. 3 and 5 mentioned above are executed by a reproducing apparatus having no image pickup unit.

That is, the processings of FIGS. 3 and 5 can be also applied to the case where the images which had been picked up by the image pickup apparatus, to which the classification information was automatically provided, and which has been recorded onto a recording medium such as a memory card is displayed by the reproducing apparatus (image viewer, PC, or the like) having no image pickup unit. In this case, it is assumed that the classification information providing conditions which are used in the image pickup apparatus have been stored in the reproducing apparatus or the classification information providing conditions which are used in the image pickup apparatus have been stored in the memory card. The classification information providing condition edited in the processing of FIG. 5 may be applied only to the image which has already been recorded in the memory card and the classification information may be re-provided. The classification information providing condition edited in the processing of FIG. 5 is recorded in the memory card and when the memory card is subsequently connected to the image pickup apparatus, the classification information providing condition stored in the image pickup apparatus may be updated.

Although the invention has been described in detail based on its exemplary embodiments, the invention is not limited to those specific embodiments but various forms within a scope without departing from the spirit of the invention are also incorporated in the invention. Further, each of the foregoing embodiments has merely shown an embodiment of the invention and those embodiments may be properly combined.

Other Embodiment

The invention is also realized by executing the following processings. That is, software (computer program) for realizing the functions of the embodiments mentioned above is supplied to a system or an apparatus through a network (communication) or various kinds of computer-readable recording media. A computer (or CPU, MPU, or the like) of the system or apparatus reads out program codes and executes processings based on them. In this case, the software and the recording medium in which the software has been recorded as program codes of the computer construct the invention.

This application claims the benefit of Japanese Patent Application No. 2009-243607 filed on Oct. 22, 2009, which is hereby incorporated by reference herein in its entirety.

What is claimed is:

1. An image pickup apparatus comprising:
    an image pickup unit configured to pick up an image;
    a recording control unit configured to effect recording control in such a manner that in the case where at least either photographing settings at the time when the image is picked up by the image pickup unit or object information of the picked-up image coincides with one of a plurality of classification-information-providing-conditions, (a) classification information corresponding to the coincident classification-information-providing-condition, (b) the picked-up image, and (c) judgment information serving as information showing the coincident classification-information-providing-condition are stored in an image file and the image file is recorded onto a recording medium; and
    a display control unit configured to effect display control in such a manner that there are displayed to a display unit (a) the image stored in the image file recorded on the recording medium, (b) the classification information stored in the image file recorded on the recording medium, and (c) a plurality of classification-information-providing-conditions which include (i) a classification-information-providing-condition which coincides when the classification information stored in the image file is recorded by the recording control unit and (ii) a classification-information-providing-condition which serves as a condition under which the classification information is stored in the image file by the recording control unit and which does not coincide when the classification information stored in the image file is recorded by the recording control unit,
    wherein among the plurality of displayed classification-information-providing-conditions, the classification-information-providing-condition which coincides when the classification information stored in the image file is recorded by the recording control unit is recognizably displayed based on the judgment information.

2. An apparatus according to claim 1, further comprising a change unit configured to change the classification-information-providing-condition of specific classification information based on an operation of a user.

3. An apparatus according to claim 2, wherein the display control unit effects the display control so as to simultaneously display (a) the image, (b) the classification information, (c) the plurality of classification-information-providing-conditions which include (i) the classification-information-providing-condition which coincides when the classification information stored in the image file is recorded by the recording control unit and (ii) the classification-information-providing-condition which serves as a condition under which the classification information is stored in the image file by the recording control unit and which does not coincide when the classification information stored in the image file is recorded by the recording control unit, and (d) a display item for transiting to an editing screen for changing the classification-information-providing-condition of the classification information, and
    wherein the change unit changes the classification-information-providing-condition based on a user operation to the editing screen.

4. An apparatus according to claim 1, wherein the recording control unit effects the recording control in such a manner that the classification information corresponding to the coincident classification-information-providing-condition and the judgment information serving as information showing the coincident classification-information-providing-condition are recorded to a header of the picked-up image.

5. An apparatus according to claim 1, further comprising a storing unit in which the plurality of classification-information-providing-conditions have been recorded and which differs from the recording medium.

6. An apparatus according to claim 1, wherein the display control unit controls to display a plurality of classification information together with the image in a case that the plurality of classification information are stored in the image file, and to display a plurality of classification-information-providing-conditions each serving as a condition to provide the classification information selected from the plurality of displayed classification information such that each of the plurality of classification-information-providing-conditions serving as the condition to provide the selected classification information is recognizably identified.

7. An apparatus according to claim 1, wherein the display control unit controls to display a plurality of classification information together with the image in a case that the plurality of classification information are stored in the image file, and to display only a plurality of classification-information-providing-conditions each of which serves as the condition to provide the classification information selected from the plurality of displayed classification information.

8. A control method of an image pickup apparatus comprising the steps of:
   picking up an image;
   controlling to record the image in such a manner that in the case where at least either photographing settings at the time when the image is picked up in the image pickup step or object information of the picked-up image coincides with one of a plurality of classification-information-providing-conditions, (a) classification information corresponding to the coincident classification-information-providing-condition, (b) the picked-up image, and (c) judgment information serving as information showing the coincident classification-information-providing-condition are stored in an image file and the image file is recorded onto a recording medium; and
   controlling to display the image in such a manner that there are displayed to a display unit (a) the image stored in the image file recorded on the recording medium, (b) the classification information stored in the image file recorded on the recording medium, and (c) a plurality of classification-information-providing-conditions which include (i) a classification-information-providing-condition which coincides when the classification information stored in the image file is recorded in the recording control step and (ii) a classification-information-providing-condition which serves as a condition under which the classification information is stored in the image file in the recording control step and which does not coincide when the classification information stored in the image file is recorded by the recording control step,
   wherein among the plurality of displayed classification-information-providing-conditions, the classification-information-providing-condition which coincides when the classification information stored in the image file is recorded in the recording control step is recognizably displayed based on the judgment information.

9. A non-transitory computer-readable recording medium storing a computer readable program comprising program codes for causing the computer to execute the control method according to claim 8.

10. A display control apparatus for controlling to display, on a display unit, an image which is recorded in such a manner that when an image is picked up by an image pickup apparatus, classification information is provided to the picked-up image on the basis of photographing settings of the image pickup apparatus and object information of the image and the resulted image and judgment information serving as information showing a classification-information-providing-condition which coincides when the classification information is provided to the picked-up image are stored in an image file and the image file is recorded in a recording medium, the apparatus comprising:
   a reading unit configured to read out the image, the classification information provided to the image, a plurality of classification-information-providing-conditions serving as conditions under which the classification information is provided to the picked-up image, and the judgment information, which are stored in the image file recorded in the recording medium; and
   a display control unit configured to effect display control in such a manner that there are displayed to the display unit (a) the image read out by the reading unit, (b) the classification information provided to the image, and (c) a plurality of classification-information-providing-conditions which include (i) a classification-information-providing-condition which coincides when the classification information is provided to the picked-up image and stored in the image file recorded in the recording medium and (ii) a classification-information-providing-condition which serves as a condition under which the classification information is provided to the picked-up image and which does not coincide when the classification information is provided to the picked-up image stored in the image file recorded in the recording medium,
   wherein among the plurality of displayed classification-information-providing-conditions, the classification-information-providing-condition shown by the judgment information read out by the reading unit is recognizably displayed based on the judgment information.

11. A control method of a display control apparatus for controlling to display, on a display unit, an image which is recorded in such a manner that when an image is picked up by an image pickup apparatus, classification information is provided to the picked-up image on the basis of photographing settings of the image pickup apparatus and object information of the image and the resulted image and judgment information serving as information showing a classification-information-providing-condition which coincides when the classification information is provided to the picked-up image are stored in an image file and the image file is recorded in a recording medium, the control method comprising the steps of:
   reading out the image, the classification information provided to the image, a plurality of classification-information-providing-conditions serving as conditions under which the classification information is provided by the picked-up image, and the judgment information, which are stored in the image file recorded in the recording medium; and
   controlling to display the image in such a manner that there are displayed to the display unit (a) the image read out in the reading step, (b) the classification information provided to the picked-up image, and (c) a plurality of classification-information-providing-conditions which include (i) a classification-information-providing-condition which coincides when the classification information is provided to the picked-up image and stored in the image file recorded in the recording medium and (ii) a classification-information-providing-condition which serves as a condition under which the classification information is provided to the picked-up image and which does not coincide when the classification information is provided to the picked-up image stored in the image file recorded in the recording medium, wherein among the plurality of displayed classification-information-providing-conditions, the classification-information-providing-condition shown by the judgment information read out in the reading step is recognizably displayed based on the judgment information.

12. A non-transitory computer-readable recording medium storing a computer readable program comprising program codes for causing the computer to execute the control method according to claim 11.

* * * * *